United States Patent Office 3,459,036
Patented Aug. 5, 1969

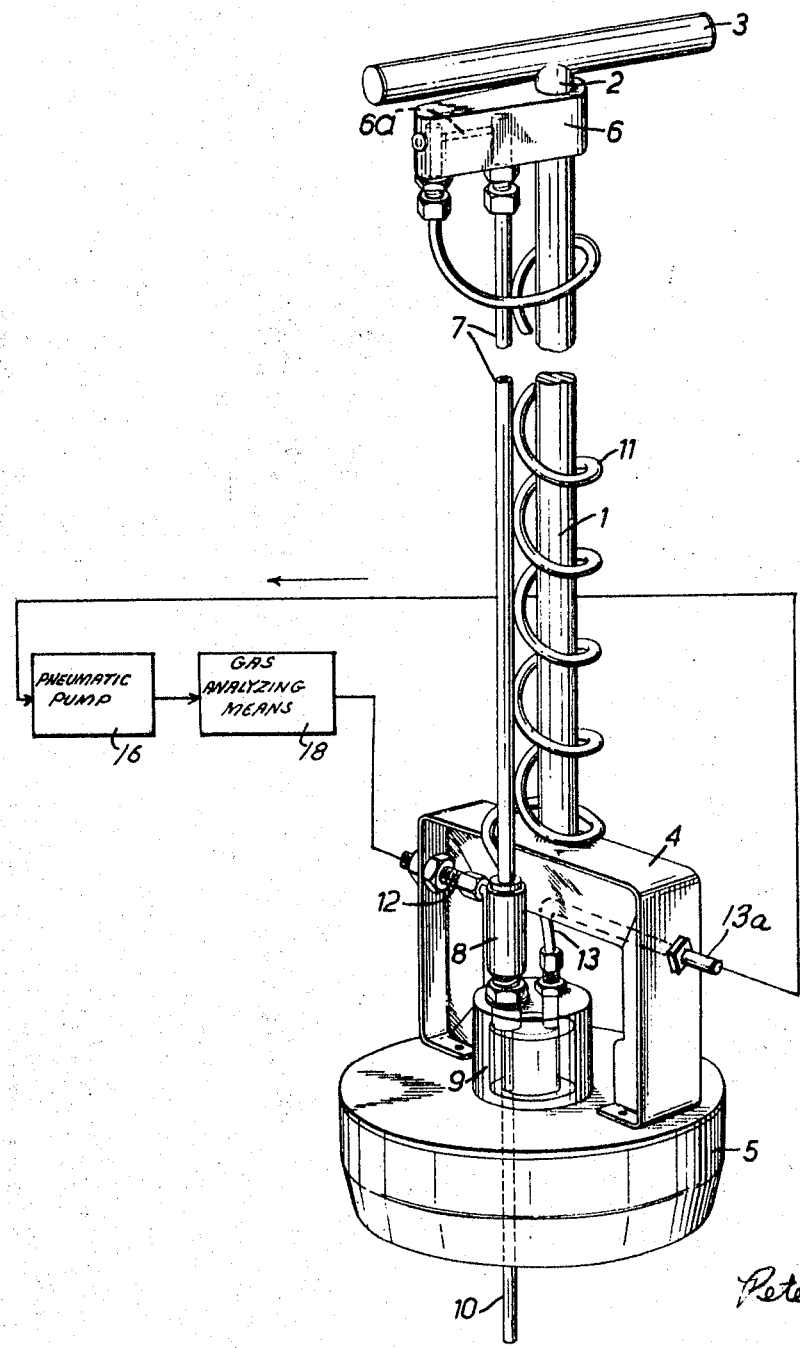

3,459,036
GAS SAMPLING PROBES USED WITH APPARATUS FOR DETECTING WATER LEAKS
Peter Powell, Henley-on-Thames, England, assignor to The Water Research Association
Filed Sept. 21, 1967, Ser. No. 669,574
Claims priority, application Great Britain, Sept. 28, 1966, 43,266/66
Int. Cl. G01m 3/08
U.S. Cl. 73—40.5       10 Claims

ABSTRACT OF THE DISCLOSURE

A gas sampling probe for detecting water leaks in an underground conduit or the like, including a guide member supporting at its lower end a cap for sealing the mouth of a barhole. A hollow probe mounted for longitudinal sliding movement in the cap is connected at its upper end with a source of pressure air to supply air downwardly into the barhole, and outlet means communicate with the upper region of the zone beneath the cap to withdraw the gas from the barhole for analysis.

---

This invention is concerned with a gas sampling probe for use with apparatus for detecting water leaks in underground pipe lines.

According to the invention there is provided a gas sampling probe for use with apparatus for detecting gas leaks in underground pipe lines, comprising a guide member supporting at its lower end a cap for sealing the mouth of a barhole, a hollow probe element supported at its upper end by the guide member so as to be movable downwardly through the cap and into a barhole when such is sealed by the cap, gas inlet means connected with the upper end of the probe element for passing gas downwardly therethrough and into a barhole, and gas discharge means communicating with an upper region of the zone beneath the cap, for permitting withdrawal of gas from a barhole.

In order that the invention may be well understood there will now be described, by way of example only, one embodiment thereof, reference being had to the accompanying drawing which is a perspective view of a gas sampling probe embodying the invention.

The gas sampling probe comprises a guide member 1 formed at the upper end 2 with a handle 3 and carrying at its lower end, by way of a yoke 4, a hollow cap 5 shaped and dimensioned to fit over the mouth of a barhole, that is to say a hole made in the ground by repeatedly plunging a bar of say 1-inch diameter into the ground, Slidable on member 1 is a union piece 6 to which is secured a probe pipe 7 extending parallel with member 1 and through an air-tight gland 8 communicating with a transparent cover 9 over an aperture in the cap, said gland including guide means for guiding the lower end of the pipe. The pipe 7 has an end 10 perforated to permit air to be passed through it, which end may be made as a detachable unit by being screwed on to the lower end of the pipe 7 so that a damaged end may be removed and quickly replaced. Threaded extension tubes may also be screwed on to the pipe 7 to enable deeper barholes to be sampled.

Also coupled to the union piece 6 for communication with the pipe 7 via a passage 6a in the union piece is a flexible pipe 11 coupled to a union 12 carried by the yoke 4. The interior of the transparent cover 9 is connected by a pipe 13 to a union 13a (similar to the union 12) attached to the yoke 4.

The union to which the pipe 13 is coupled is connected to the suction side of a portable pneumatic pump 16 carried by the operator, and the union 12 is connected to the exhaust side of the same pump, a portable gas analysis apparatus 18 being coupled to the circuit before or after the pump.

To detect a leak, nitrous oxide is fed into the pipe line and goes into solution in the water. At the leak, the nitrous oxide will be present either in solution in the water which has escaped or as gas at or below ground level. To locate the leak, barholes are made, desirably down to the region of the pipe. The probe operator takes the probe successively to the barholes and at each locates the cap over the mouth of the hole, thereby sealing the hole, lowers the pipe 7 until the lower end is in the region of the bottom of the barhole and operates the pump to drive air via the union 12 and the flexible pipe 11 to the union piece 6 and therefrom down the pipe 7 into the barhole, and to draw air from the barhole up the pipe 13.

The gas drawn from the barhole is analyzed and the presence of nitrous oxide determined. By comparison of results from various barholes the presence of a leak can be determined.

The barholes may start to fill with water upon formation and there may be mud and loose rubble in the hole. Because the design of the probe is such that the gas is circulated by pumping it down the pipe 7, clogging in and around the pipe 7 is almost impossible. In addition, the cover 9 and the pipe 13 are sufficiently spaced from any water or dirt disturbed by the air flow to prevent gas circulation by clogging.

The cover is made transparent to help the operator to check that water, either from a barhole or trapped by mud which may accumulate in the underside of the cap, is not about to enter the pipe 13.

The cap may include a compressible gasket, fitted inside the cap and protruding below it, to improve sealing of the cap over barholes driven into hard surfaces such as metalled roads.

I claim:
1. A gas sampling probe for use with apparatus for detecting water leaks in underground pipe lines, comprising a guide member supporting at its lower end a cap for sealing the mouth of a barhole, a hollow probe element mounted for longitudinal sliding movement through said cap, support means guided for movement along the guide member and fast with the upper end of said probe element so that said probe element is movable downwardly through said cap and into a barhole when such is sealed by the cap, gas inlet means connected with the upper end of said probe element for passing gas downwardly therethrough and into a barhole, and outlet means communicating with an upper region of the zone beneath said cap for permitting withdrawal of gas from a barhole.

2. The gas sampling probe set forth in claim 1, wherein said support means comprises a union piece, said gas inlet means comprises a flexible tube connected at one end to said union piece and at the other end to a union fixed with respect to the guide member, said union piece includes means defining a passage interconnecting said flexible tube and said probe element.

3. The gas sampling probe set forth in claim 2, wherein said flexible tube is disposed in coiled fashion about said guide member.

4. The gas sampling probe set forth in claim 2, including a yoke carried by the lower end of said guide member and itself supporting said cap, said union being carried by said yoke.

5. The gas sampling probe set forth in claim 1, including a transparent cover on top of said cap and communicating with the zone beneath said cap, said outlet means being in communication with the interior of said transparent cover.

6. The gas sampling probe as set forth in claim 5, including an air-tight gland connected to said transparent cover, the lower end of said probe element being slidably guided in said gland.

7. The gas sampling probe set forth in claim 5, including a yoke at the lower end of said guide member and supporting said cap, and wherein said outlet means comprises a union carried by said yoke and a pipe connected at one end to said union and at the other end to said transparent cover.

8. The gas sampling probe set forth in claim 1, including a handle at the upper end of said guide member.

9. The gas sampling probe set forth in claim 1, wherein the lower end of the probe element is screwthreaded to engage detachable end elements.

10. The gas sampling probe set forth in claim 1, wherein said gas inlet means is connected with the output side of a pneumatic pump, said gas discharge means is connected to the input side of said pneumatic pump, and a gas analyser is interposed between said pneumatic pump and said gas sampling probe.

References Cited

UNITED STATES PATENTS

| | | |
|---|---|---|
| 634,687 | 10/1899 | Hartenfels. |
| 2,928,247 | 3/1960 | Hubbell _____ 73—40.5 XR |

LOUIS R. PRINCE, Primary Examiner

J. NOLTON, Assistant Examiner

U.S. Cl. X.R.

73—40